US011823220B2

(12) United States Patent
Berger et al.

(10) Patent No.: US 11,823,220 B2
(45) Date of Patent: Nov. 21, 2023

(54) ACCESS TO MEDIA BITES

(71) Applicants: SONY CORPORATION, Tokyo (JP); SONY PICTURES TECHNOLOGIES INC., Culver City, CA (US)

(72) Inventors: Richard Berger, Culver City, CA (US); John Calkins, Los Angeles, CA (US)

(73) Assignees: SONY GROUP CORPORATION, Tokyo (JP); SONY PICTURES TECHNOLOGIES, INC., Culver City, CA (US)

( * ) Notice: Subject to any disclaimer, the term of this patent is extended or adjusted under 35 U.S.C. 154(b) by 0 days.

(21) Appl. No.: 16/808,230

(22) Filed: Mar. 3, 2020

(65) Prior Publication Data
US 2020/0202373 A1 Jun. 25, 2020

Related U.S. Application Data

(63) Continuation of application No. 13/228,269, filed on Sep. 8, 2011, now abandoned.
(Continued)

(51) Int. Cl.
*G06Q 30/02* (2023.01)
*G06Q 30/0207* (2023.01)
(Continued)

(52) U.S. Cl.
CPC ..... *G06Q 30/0207* (2013.01); *G06Q 30/0226* (2013.01); *G06Q 30/0283* (2013.01); *G06Q 30/0601* (2013.01)

(58) Field of Classification Search
CPC .......................................... G06Q 30/02–0277
See application file for complete search history.

(56) References Cited

U.S. PATENT DOCUMENTS 7,099,846 B1 * 8/2006 Ishibashi ................ G06Q 30/02
705/51
2009/0112749 A1 * 4/2009 Monteverde ........... G06Q 40/04
705/37
(Continued)

FOREIGN PATENT DOCUMENTS

WO WO-03103293 A1 * 12/2003 ......... H04N 7/17318

OTHER PUBLICATIONS

2010 IEEE 2nd Symposium on Web Society (pp. 83-86), Jian Wang • Xiumei Wu • Na Guo • Changyong Niu , Department of Network Engineering, Shanghai Second Polytechnic University Shanghai Meida Info Company, Shanghai, China Department of Computer Science, Zhengzhou University. (Year: 2010).*

*Primary Examiner* — Raquel Alvarez
(74) *Attorney, Agent, or Firm* — Procopio, Cory, Hargreaves & Savitch LLP

(57) ABSTRACT

Accessing media data in bites, including: receiving a request from a client to access a media item, and determining an address of the requested media item, wherein the address indicates a location where the media item is stored; determining an identification number of a piece of the media item selected by the client; updating the address of the media item by combining the address with the identification number of the piece of the media item selected by the client; valuating the piece of the media item selected by the client, and sending a valuated price to the client; and providing access to the requested media item using the updated address of the media item when a payment for the valuated price is received from the client.

13 Claims, 4 Drawing Sheets

Related U.S. Application Data

(60) Provisional application No. 61/381,014, filed on Sep. 8, 2010.

(51) Int. Cl.
*G06Q 30/0601* (2023.01)
*G06Q 30/0226* (2023.01)
*G06Q 30/0283* (2023.01)

(56) References Cited

U.S. PATENT DOCUMENTS

2011/0071841 A1* 3/2011 Fomenko ............ G06F 16/1834
 705/1.1
2011/0307545 A1* 12/2011 Bouazizi .......... H04N 21/23439
 709/203

* cited by examiner

ACCESS TO MEDIA BITES

CROSS-REFERENCE TO RELATED APPLICATIONS

The present application is a continuation application of co-pending U.S. patent application Ser. No. 13/228,269 (filed Sep. 8, 2011), which claimed the benefit of priority under 35 U.S.C. § 119(e) of U.S. Provisional Patent Application No. 61/381,014, filed Sep. 8, 2010, entitled "Movie Bites." The disclosures of the above-referenced applications are incorporated herein by reference.

BACKGROUND

Field of the Invention

The present invention relates to electronic media data, and more specifically, to consuming media data in bites.

Background

The distribution of electronic media data (e.g., music, videos, movies, and television shows) may be accomplished using various methodologies. For example, entire media data files may be transferred from a media data server to a client electronic device. Alternatively, a media data stream may be established between the media data server and the client electronic device.

SUMMARY

Implementations of the present invention provide for consuming media data in bites. In one implementation, a method of accessing media data in bites is disclosed. The method includes: receiving a request from a client to access a media item, and determining an address of the requested media item, wherein the address indicates a location where the media item is stored; determining an identification number of a piece of the media item selected by the client; updating the address of the media item by combining the address with the identification number of the piece of the media item selected by the client; valuating the piece of the media item selected by the client, and sending a valuated price to the client; and providing access to the requested media item using the updated address of the media item when a payment for the valuated price is received from the client.

In another implementation, a media access controller is disclosed. The controller includes: a media access map to receive a media access request for a media item from a client device, and to output an address for the requested media item; a processor to receive the address of the media item and generate a media access menu which is presented to the client device to enable the client device to select a piece of the media item to access; a combiner to update the address of the media item by combining the address with a selection of the piece of the media item from the client device; a valuator to valuate the piece of the media item selected by the client, and to send a valuated price to the client device; and an access interface to provide access to the requested piece of the media item using the updated address of the media item when a payment for the valuated price is received from the client device.

In another implementation, a non-transitory tangible storage medium storing a computer program for accessing media data in bites is disclosed. The computer program comprises executable instructions that cause a computer to: receive a request from a client to access a media item, and determining an address of the requested media item, wherein the address indicates a location where the media item is stored; determine an identification number of a piece of the media item selected by the client; update the address of the media item by combining the address with the identification number of the piece of the media item selected by the client; valuate the piece of the media item selected by the client, and sending a valuated price to the client; and provide access to the requested media item using the updated address of the media item when a payment for the valuated price is received from the client.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Figure 1:
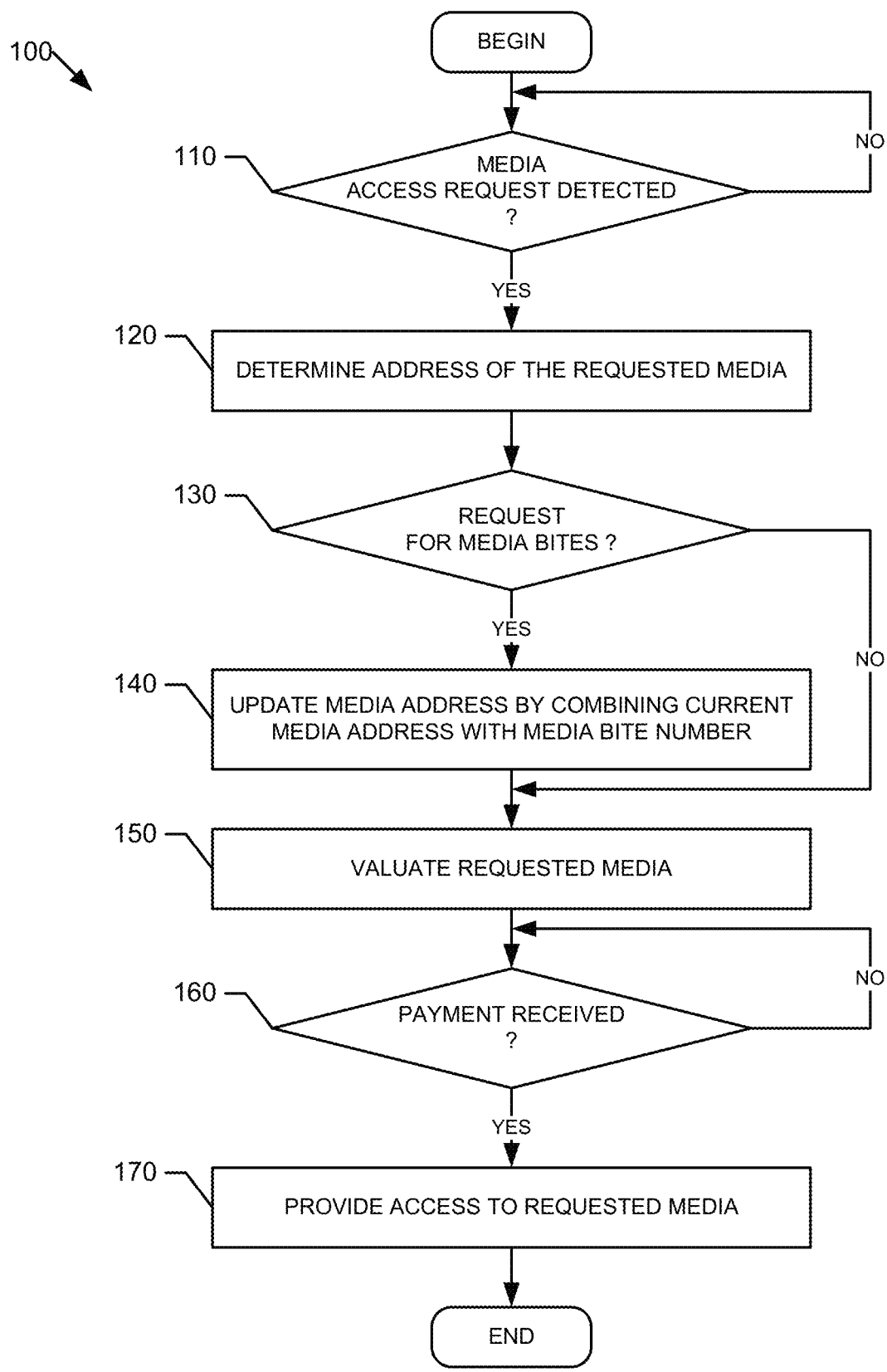
FIG. 1 is a flowchart illustrating a technique for consuming media data in bites using a media access controller in accordance with one implementation of the present invention.

Certain implementations as disclosed herein provide for consuming media data in bites using a media access controller. In reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

When an item of media is available for access, a media access controller can be referenced for media access in bites. In one implementation, a server stores at least one media item as a whole and in pieces or bites. For example, the pieces can be stored separately from the whole such that the media item would be stored twice. In another example, the server stores a table of indices or pointers into the media item to define pieces of the media item. A user can access, view and listen to media items available from the server through a compatible client application on a client device (e.g., PC, game console, or other network-enabled device). The server defines the choices to present to the user. Alternatively, the client device may define the choices or may select from among the possible choices provided to the server to present a subset to the user. In this alternate implementation, the client device presents the option to buy access to the media item as a whole or to one or more pieces of the media item. The user can then choose whether to pay to access the media item in pieces or all at once. If the user buys access to pieces, the user can continue to buy access to the remaining pieces one at a time, in groups, or to the remaining pieces.

Similarly, the client device can present different rights options for the pieces or the media item as a whole. For example, the user can choose to keep the pieces unlocked and accessible indefinitely, or only for a limited period. The client device can also present different pricing depending on purchase activity. For example, if the media item as a whole costs $20 and is divided into 15 pieces each costing $2 (for a total cost of $30 if all pieces are purchased individually), when a user has paid $20 for the pieces obtained so far, the client can offer the remaining pieces free of charge or discounted. In another example, if a user buys access to a first media item as a whole, a piece of another media item may be offered at a discount or for free. In another example, pieces of a media item can be offered at a discount or for free to users participating in a subscription service or loyalty program.

In one implementation, the client device plays multiple pieces of a media item seamlessly transitioning between the pieces. In another implementation, the client device combines the pieces together to form larger pieces or a single piece (e.g., after all the pieces have been purchased). Similarly, software can be provided that allows a client device to combine pieces from multiple items of media to create compilations.

In another implementation, a user can select an option to pay for the portion of content accessed as in a 'pay-as-you-go' scheme. In one example, a media item is divided into pieces and the pieces are delivered to the client device as needed. Initially, the first piece is delivered and the client device plays and/or displays the first piece of the media item. When a certain threshold is reached, the next piece is delivered and the user can continue to seamlessly view the media item. If the user stops playback, no further pieces are delivered. The user is charged only for the pieces actually delivered or played (e.g., beyond a threshold). The client device can notify the user in various ways of a new piece (and a new charge associated with the new piece) before it starts. For example, the client device can issue and display a pop-up window, icon, or message, or present a dialog box or other confirmation to proceed. In this example, a default setting would be to proceed and charge, with alternative settings including stopping the playback without authorization or charging based on user preference settings. To encourage the completion of the purchase of the pieces, the user could be offered a discount to purchase access to the rest of the media item. Alternatively, the offered discount could be a discount which can be applied against a different item of media. In another example, the entire media item is delivered initially (though playback can begin before completion) but the playback progress through the media item is tracked. The user is charged for the portion played or the entire charge is paid up front but a refund (or "return") is applied for the unused portion (which would also be locked to prevent further playback without payment). In a subscription model, a subscriber may be allowed a certain number of "returns" of purchased or rented content to receive a refund for unused portions.

The content server and storefront server may be the same system or separate systems. Similarly, the servers can be operated by the same or different companies. Multiple storefront services could access the same content server/service, or one storefront could access multiple content servers/services (or a many-to-many relationship could be used). The content service and storefront service can track the purchasing activity and patterns of consumers, individually and in the aggregate. For example example, a content service tracks which pieces have been accessed or purchased for an account and can provide missing pieces (e.g., the next unviewed piece) to a different device accessing the same account. The client device can also track the local usage patterns. For example, a service can track the conversion pattern (e.g., converting a sale of a segment to a sale of the entire media item) for various criteria, such as consumer demographic, time, price, genre, consumer history, etc. Based on that analysis, a user can be provided with recommendations or promotions that are customized to the user or that the service provider desires to push.

There are advantages to offering and delivering a media item, such as a movie, in pieces rather than as whole. Transferring and storing pieces are easier. For example, transferring and storing a 20 MB or 200 MB piece of a 2 GB movie across a network requires less bandwidth and less storage capacity than transferring and storing the entire 2 GB in one transaction. Sending the media pieces over time also spreads the distribution load over time and provides the pieces closer in time to when the pieces are actually needed. Further, a piece of media item can be offered at a lower price and so may be more attractive to purchase, such as in impulse buying. The initial piece can then serve as a sample or introduction to buying the whole. The initial piece could also be offered for free or included as a promotional with another product (e.g., pre-loaded on a media player). In another example, a user may only want to access part of a movie, such as when the user has already seen half of a movie and only wants to pay to see the remaining half.

FIG. 1 is a flowchart 100 illustrating a technique for consuming media data in bites using a media access controller in accordance with one implementation of the present invention. In the illustrated implementation of FIG. 1, when media access request is detected, at box 110, an address of the requested media item is determined, at box 120. Examples of media for which access requests are received include videos, images, music, television shows, texts (e.g., books or magazines), etc. In one implementation, the determined address refers to an address or pointer to the location where the whole media item stored. In another implementation, the determined address refers to an address or pointer to the location where the first piece of the media item is stored.

A determination is then made, at box 130, as to whether the request for media access is to access the media item in pieces or bites. When it is determined, at box 130, that the request is to access the media item in pieces or bites, the media address is updated, at box 140, by combining the current media address with a media bite number. For example, if the media address for media item 123456 is determined to be 'addr123456', and the user has selected media bite 78, then the updated media address for the media bite can be 'addr123456078'. Since three digits have been allotted for the bite number in this example, up to 1000 bites or pieces of media 123456 can be addressed. In a further example, if the user chooses not to access the media item in pieces but as a whole, then the updated media address can be 'addr123456000' which indicates that the bite number for this case is '000'. Although the above examples show the combining of the current media address with a media bite number only as appending the media bite number to the end of the current media address, other ways of combining the two numbers are contemplated. For example, in one implementation, the media bite number can be appended at the front of the current media address. In another implementation, each of the two numbers is generated from a function and the combination is generated as a convolution of the two functions.

In some implementations, accessing media items in bites include accessing the media items in time slices or chunks rather than in physical pieces. For example, if a user purchases a 30 minute bite of a movie, the user can use the 30 minute bite all at once to view 30 minutes worth of the movie, or view a 10 minute slice of one movie and if not satisfied, the user can then use the next 10 minute slice for a different movie. This allows the user to sample various media titles. Similarly, in another implementation, a user can purchase slices or time increments that are independent of particular content, which can then be used to access part of a media item selected at a later time. For example, a user could purchase a pack of six 10-minute slices and then use them for later selections. In one such implementation, the purchased slices form a pool or wallet that can be used while watching content to continue past the end of a slice (e.g., after watching 10 minutes of content the player can confirm with the user to continue watching the content and indicate the remaining slices in the pool, or offer the purchase of additional slices or the purchase of the remainder of the content). The granularity of the slices can also vary, such as selling 10 minute or 5 minute slices or selling a pool of individual minutes (similar to a pay as you go model, such as with minutes for a mobile phone). Other implementations may use additional or different bases for the slices or increments, such as download or streaming data, scenes, or chapters (e.g., DVD chapters). In a further implementation, once the user decides on a movie (e.g., a full-length version) to purchase, the time slice or the movie bite is credited towards the purchase of the full-length version of the movie. In one implementation, the user can purchase the media bites at any time and in any order. In another implementation, the user can only purchase the bites in a linear, consecutive sequence.

In another variation, each media bite is marked with a unique identifier tied to a user account or client player so that only bites with that identifier can be played on that player, which can be enforced by a digital rights management (DRM) system. This would prevent multiple users from pooling and combining individual, different media bites to make a complete full-length version of the media. In yet another variation, users can combine media bites with friends. For example, a user can present a media bite to a friend or another user as a gift. In another example, sharing bites could be a good way to do viral marketing that uses pre-existing social networks to produce increases in brand awareness or to achieve other marketing objective, such as product sales, through self replicating viral processes. In all of the implementations and examples described above, it should be noted that media other than video can be used. For example, media can be audio, text, games, and possibly with different bases for slices or bites, such as pages, words, levels, etc.

Once the selection is made by the user, the requested media item is valuated, at box 150. As discussed above, there are several different options for accessing a media item and thus provide several different ways the requested media item can be valuated depending on the purchase activity. For example, a user can download a media item in pieces that are each two chapters long (e.g., 10% of the movie length) at a price of $2.00 each. There is also an option to buy the whole media item for a second price. The second price may adjust depending on how much the user has already paid. In another example, if the media item as a whole costs $20 and is divided into 15 pieces each costing $2 (total cost of $30 if all purchased individually), when a user has paid $20 for the pieces obtained so far, the client can offer the remaining pieces free of charge (or discounted).

In another example, if a user buys access to a first media item as a whole, a piece of another media item may be offered at a discount or for free. In another example, pieces of a media item can be offered at a discount or for free to users participating in a subscription service or loyalty program. In another example, the user is charged only for the pieces actually delivered or played (e.g., beyond a threshold). The client device can notify the user in various ways of a new piece (and a new charge associated with the new piece) before it starts. For example, the client device can issue and display a pop-up window, icon, or message, or present a dialog box or other confirmation to proceed (e.g., defaulting to proceed and charge, to stop playback without authorization, or to charge based on user preference settings). To encourage the completion of the purchase of the piece, the user could be offered a discount to purchase access to the rest of the media item. Alternatively, the offered discount could be a discount which can be applied against a different item of media.

In yet another example, the entire media item is delivered initially (though playback can begin before completion) but the playback progress through the media item is tracked. The user is charged for the portion played or the entire charge is paid up front but a refund (or "return") is applied for the unused portion (which would also be locked to prevent further playback without payment). In a subscription model, a subscriber may be allowed a certain number of "returns" of purchased or rented content to receive a refund for unused portions.

Once the valuation is done and the price is set for the requested media item, a determination is made, at box 160, whether the payment has been received. Access to the requested media item is provided, at box 170, once the payment has been received.

Figure 2:
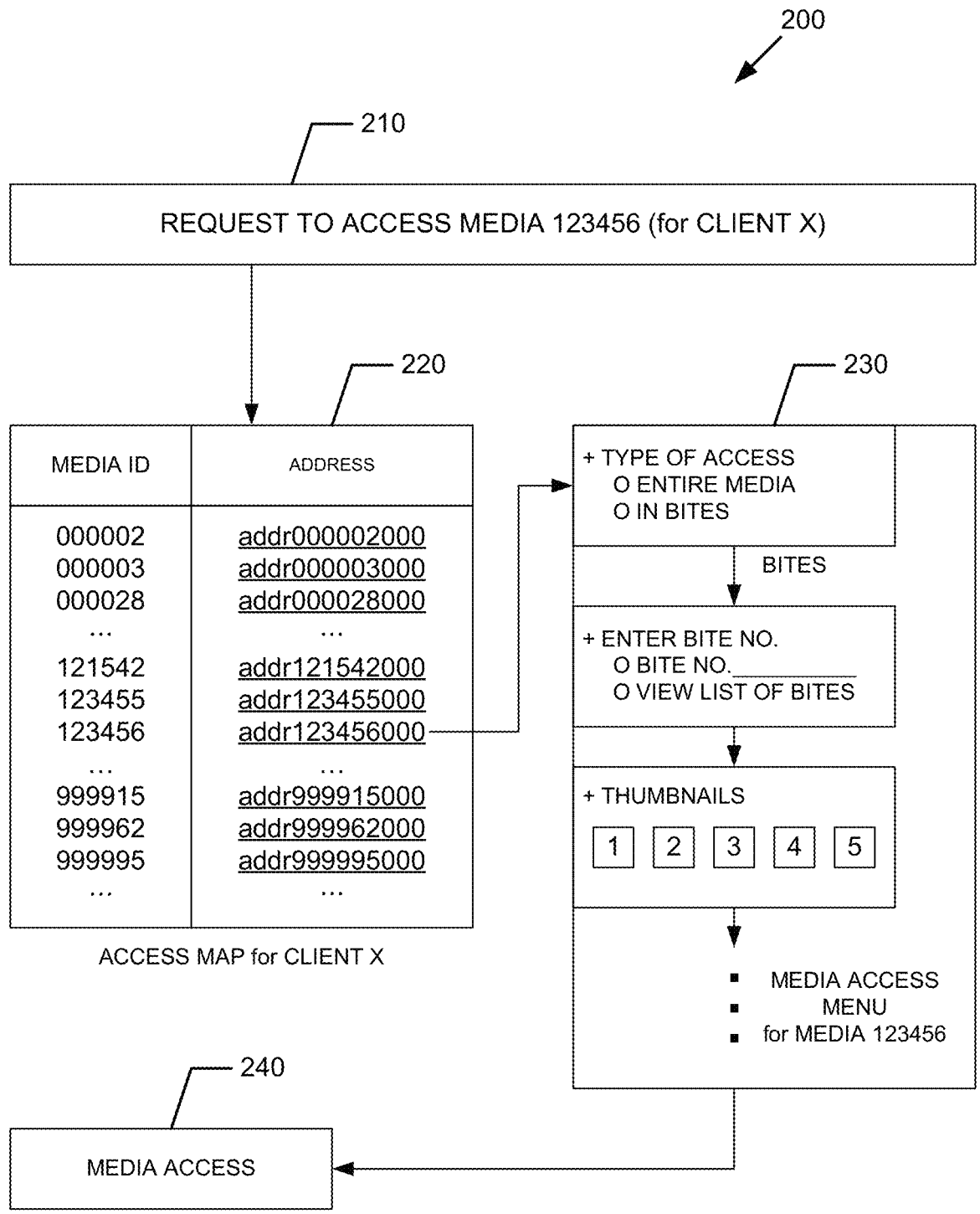
FIG. 2 is a functional flow diagram illustrating an example process for consuming media data in bites in accordance with one implementation of the present invention.

FIG. 2 is a functional flow diagram 200 illustrating an example process for consuming media data in bites in accordance with one implementation of the present invention. In the example implementation of FIG. 2, a request 210 to access media for Media 123456 is received from client X. This request 210 is submitted to a media access map 220 for client X. This access map 220 provides addresses corresponding to all media for which client X has submitted requests for access. In this implementation, the media access map 220 indicates that Media 123456 is stored in address 'addr123456000'. The media access map 220 also includes a reference pointer to a media access menu 230 for Media 123456. The media access menu 230 provides a series of inquiries to the user to determine whether the request to access Media 123456 is to access it in pieces or as a whole. Further, the media access menu 230 determines which piece(s) of the media item to access by providing overviews of the pieces to the user. The overviews can be presented to the user in thumbnails, snippets, or other method for presenting short summaries of the pieces to aid the user in selecting piece(s) of the media item. Since three digits have been allotted for the bite number in this example, Media 123456 can be divided into up to 1000 bites or pieces. Again, as discussed above, once the selection for piece(s) to access is made and the payment is received, the media item 240 is made available for access.

Figure 3:
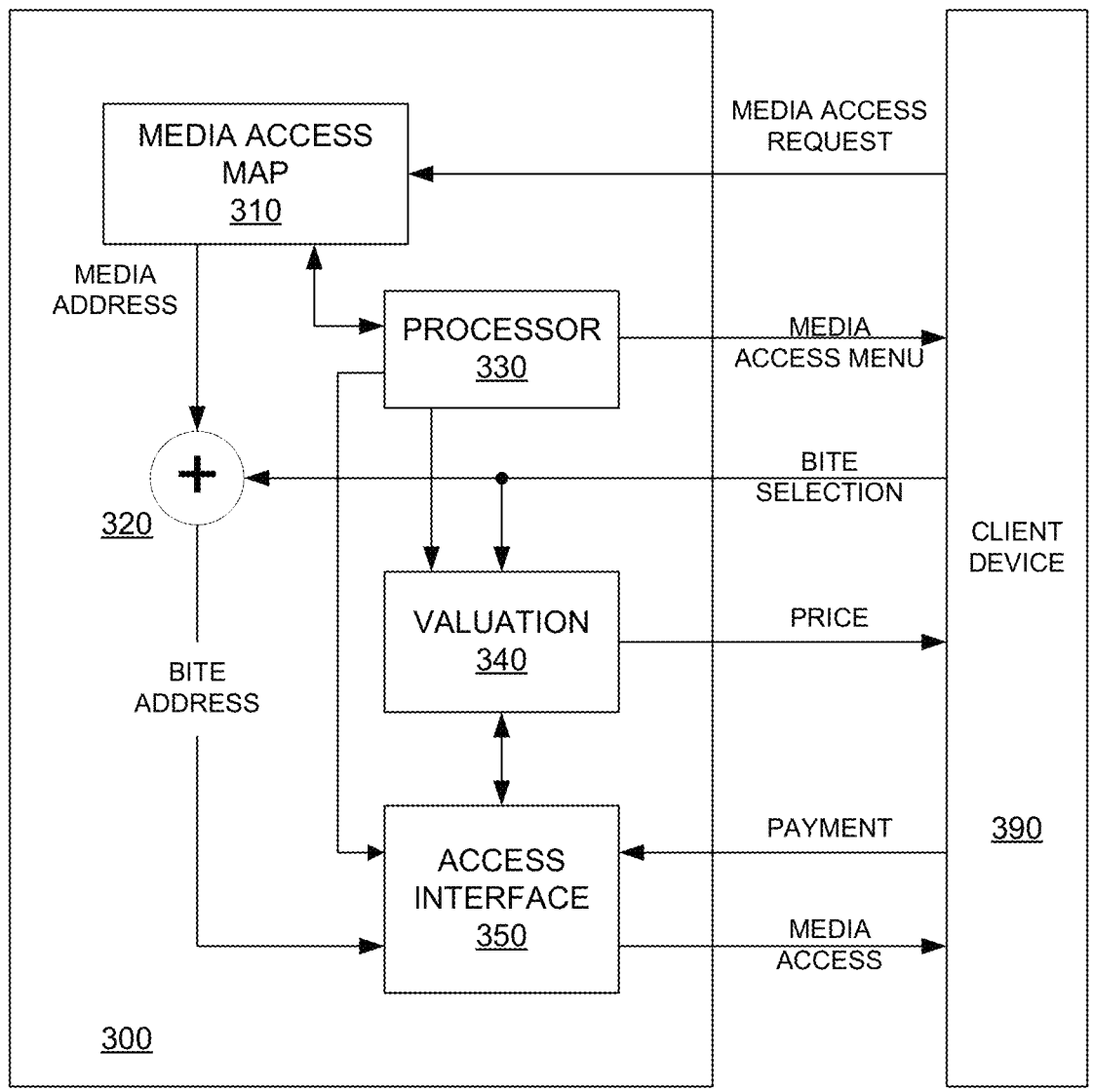
FIG. 3 is a functional block diagram of a media access controller in accordance with one implementation of the present invention.

FIG. 3 is a functional block diagram of a media access controller 300 in accordance with one implementation of the present invention. In one implementation, the media access controller 300 is implemented in hardware configured within a server (not shown). In another implementation, the media access controller 300 is implemented as a stand-alone hardware device configured to reside remotely from the server. In the illustrated implementation of FIG. 3, the media access controller 300 includes a media access map 310, a combiner 320, a processor 330, a valuator 340, and an access interface 350. The media access controller 300 also interacts with a client device 390.

In the illustrated implementation of FIG. 3, the media access map 310 receives a media access request from the client device 390. As described above, the media access map 220 provides addresses corresponding to all media for which the user using the client device 390 has submitted requests for access. The media access map 220 also includes a reference pointer to a media access menu 230. Thus, in response to the media access request, the processor 330 within the media access controller 300 sends a media access menu 230 to the client device 390, which provides a series of inquiries to the client device 390 to determine whether the request to access media is to access it in pieces or as a whole. Further, the media access menu 230 determines which piece(s) of the media item to access by providing overviews of the pieces to the client device 390. The overviews can be presented to the client device 390 in thumbnails, snippets, or other method for presenting short summaries of the pieces to aid the user in selecting piece(s) of the media item.

Once the user makes the selection to access the requested media item, the selection is received from the client device 390, and the media address is determined by the combiner 320. For example, if the user selects to access the media item as a whole, the client device 390 sends a bite selection of '000'. Otherwise, if the user selects to access the media item in pieces/bites, the selected bite number is sent. For example, if the user selects bite 78, a bite selection of '078' is received by the combiner 320. Thus, as described above, the combiner 320 appends the bite selection to the media address generated by the media access map 310 to generate a bite address. This address is then passed onto the access interface 350.

Once the media item selection is made by the user, the requested media item is valuated by the valuator 340 and the price for the media item is sent to the client device 390. The valuator 340 also sends the price to the access interface 350 so that when the payment is received from the client device 390, the access interface 350 compares the payment to the price to determine if a correct payment is received. If it is determined that the correct payment has been received, the access interface 350 provides access to the media item to the client device 390 using the bite address received from the combiner 320. In another implementation, the access interface 350 further includes a tracking unit configured to deliver the entire media item to the client device, track a playback progress through the media item, and charge only for the pieces of the media item which have been played.

Figure 4A:
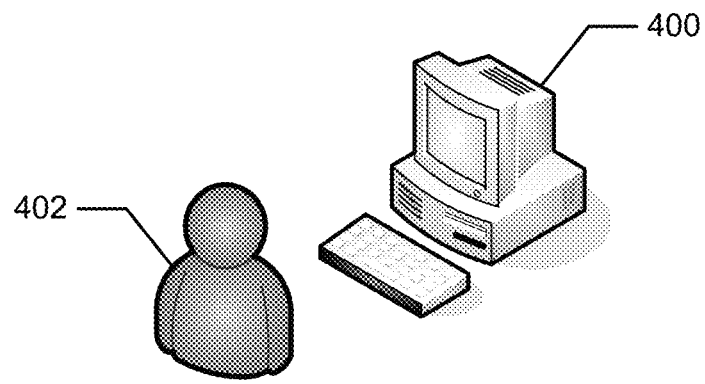
FIG. 4A illustrates a representation of a computer system and a user.

FIG. 4A illustrates a representation of a computer system 400 and a user 402. The user 402 can use the computer system 400 to implement media access control. The computer system 400 stores and executes media access control 490.

Figure 4B:
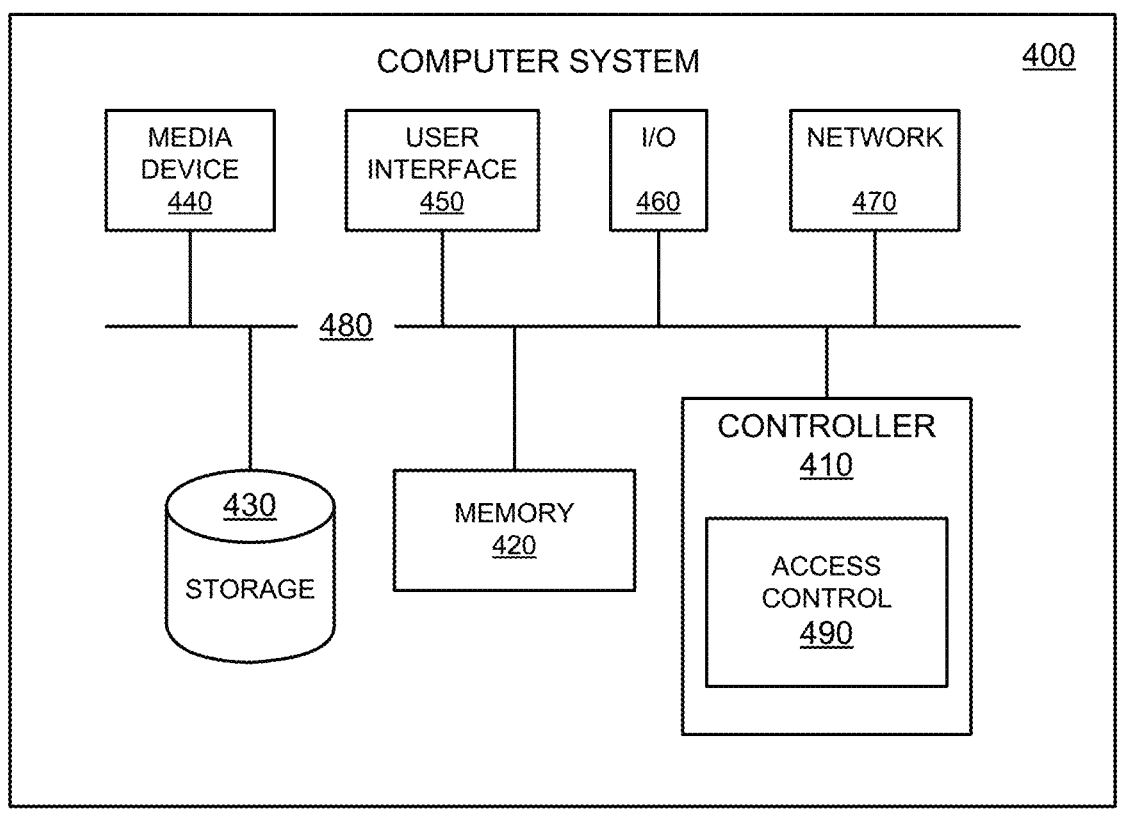
FIG. 4B is a functional block diagram illustrating the computer system hosting the media access control in accordance with one implementation of the present invention.

FIG. 4B is a functional block diagram illustrating the computer system 400 hosting the media access control 490 in accordance with one implementation of the present invention. The controller 410 is a programmable processor and controls the operation of the computer system 400 and its components. The controller 410 loads instructions from the memory 420 or an embedded controller memory (not shown) and executes these instructions to control the system. In its execution, the controller 410 provides the media access control 490 as a software system. Alternatively, this service can be implemented as separate components in the controller 410 or the computer system 400.

Memory 420 stores data temporarily for use by the other components of the computer system 400. In one implementation, memory 420 is implemented as RAM. In another implementation, memory 420 also includes long-term or permanent memory, such as flash memory and/or ROM.

Storage 430 stores data temporarily or long term for use by other components of the computer system 400, such as for storing data used by the media access control 490. In one implementation, storage 430 is a hard disk drive.

The media device 440 receives removable media and reads and/or writes data to the inserted media. In one implementation, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

A system communication path 480 (e.g., a system communication bus) provides for transfers of data and control information between the media device 440, user interface 450, I/O interface 460, network interface 470, storage 430, memory 420, and controller 410.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Various illustrative implementations of the present invention have been described. However, one of ordinary skill in the art will see that additional implementations are also possible and within the scope of the present invention. For example, the media item is created to be purchased and distributed in small pieces without a predetermined end (serial network publication). Similarly, different pricing or promotional options or rights management options can be provided. In another example, the techniques can be applied to media items paid for in a rental context (e.g., access is granted only for a limited period of time). Accordingly, the present invention is not limited to only those implementations described above. It is further understood that the scope of the present invention fully encompasses other implementations that may become obvious to those skilled in the art and that the scope of the present invention is accordingly limited by nothing other than the appended claims.

What is claimed is:

1. A method of accessing a media item in slices using a client device, the method comprising:
   receiving, at a media access controller, a request from the client device to access a slice of the media item,
   wherein the slice of the media item is generated by dividing the media item into time chunks and selecting at least one of the time chunks for the slice;
   determining, at the media access controller, an address of the media item using a media access map indicating a location where the media item is stored,
   wherein the media access map includes a reference pointer to a media access menu which provides a series of inquiries to a user to determine nature of the access;
   presenting an overview of the slices in the media item to the client device to enable selection of a slice from the slices, wherein the overview is presented as a series of thumbnails of the slices;
   receiving, at the media access controller, the selection of the slice from the client device;
   determining, at the media access controller, an identification number and a price of the selected slice of the media item;
   generating, at the media access controller, a bite address of the slice of the media items by combining the address of the media item with the identification number of the selected slice of the media item;
   transmitting, at the media access controller, the price for the selected slice of the media item to the client device;
   receiving, at the media access controller, acceptance of the price of the selected slice from the client device;
   activating and transmitting, at the media access controller, an accessible code of the bite address to the client device upon receiving a payment for the price from the client device,
   wherein activating the accessible code comprises enabling the client device to access the selected slice of the media item using the accessible code at the client device; and
   transmitting the time chunks included in the selected slice to the client device at different times to spread a distribution load over time.

2. The method of claim 1, wherein combining the address of the media item with the identification number of the slices comprises
   appending the identification number of the selected slice to the end of the address of the media item.

3. The method of claim 1, further comprising
   enabling the client device to access and play the selected slice of the media item.

4. The method of claim 3, further comprising
   presenting to the client device an option to purchase other slices of the media item while the client device is playing the slice of the media item.

5. The method of claim 1, wherein determining the price of the selected slice of the media item comprises:
   determining a time duration of the selected slice; and
   calculating the price of the slice of the media item by dividing the time duration of the selected slice by a time duration of the media time and multiplying by a price of the media item.

6. A method of accessing a media item in slices, the method comprising:
   requesting, from a media access controller, to access a slice of the media item which is generated from a selection of at least one of evenly-divided time chunks of the media item,
   wherein the media access controller determines an address of the media item using a media access map indicating a location where the media item is stored,
   wherein the media access map includes a reference pointer to a media access menu which provides a series of inquiries to a user to determine nature of the access;
   receiving, from the media access controller, an overview of the slices in the media item to select a slice from the slices, wherein the overview is received as a series of thumbnails of the slices;
   sending the selection of the slice to the media access controller;
   receiving a price for the selected slice of the media item from the media access controller;
   transmitting a payment for the selected slice of the media item for the price to the media access controller;
   receiving an activated accessible code of a bite address of the selected slice of the media item from the media access controller once the payment is received by the media access controller,
   wherein the bite address of the slice of the media item is determined by combining an address of the media item indicating a location where the media item is stored with an identification number of the slice of the media item; and
   receiving the time chunks from the media access controller at different times to spread a distribution load over time.

7. The method of claim 6, further comprising
   accessing and playing the selected slice of the media item by clicking on the accessible code.

8. The method of claim 7, further comprising
   receiving an option to purchase other slices of the media item while accessing and playing the slice of the media item.

9. A non-transitory tangible storage medium storing a computer program for accessing a media item in slices, the computer program comprising executable instructions that cause a computer to:
   receive a request to access a slice of the media item from a client device;
   generate the slice of the media item by dividing the media item into time chunks and selecting at least one of the time chunks for the slice;
   determine an address of the media item using a media access map indicating a location where the media item is stored,
   wherein the media access map includes a reference pointer to a media access menu which provides a series of inquiries to a user to determine nature of the access;
   present an overview of the slices in the media item to the client device to enable selection of a slice from the slices, wherein the overview is presented as a series of thumbnails of the slices;
   receive the selection of the slice from the client device;
   determine an identification number and a price of the selected slice of the media item;
   generate a bite address of the slice of the media items by combine the address of the media item with the identification number of the selected slice of the media item;

transmit the price for the selected slice of the media item to the client device;

receive acceptance of the price of the selected slice from the client device;

activate and transmit an accessible code of the bite address to the client device upon receiving a payment for the price from the client device, wherein activate the accessible code comprises enabling the client device to access the selected slice of the media item using the accessible code at the client device; and transmit the time chunks included in the selected slice to the client device at different times to spread a distribution load over time.

10. The non-transitory tangible storage medium of claim 9, wherein the executable instructions that cause the computer to combine the address of the media item with the identification number of the slices comprises executable instructions that cause the computer to append the identification number of the selected slice to the end of the address of the media item.

11. The non-transitory tangible storage medium of claim 9, further comprising executable instructions that cause the computer to enable the client device to access and play the selected slice of the media item.

12. The non-transitory tangible storage medium of claim 11, further comprising executable instructions that cause the computer to present to the client device an option to purchase other slices of the media item while the client device is playing the slice of the media item.

13. The non-transitory tangible storage medium of claim 9, wherein the executable instructions that cause the computer to determine the price of the selected slice of the media item comprises executable instructions that cause the computer to:

determine a time duration of the selected slice; and calculate the price of the selected slice of the media item by dividing the time duration of the selected slice by a time duration of the media time and multiplying by a price of the media item.

\* \* \* \* \*